(12) United States Patent  
Popov

(10) Patent No.: US 8,018,100 B2  
(45) Date of Patent: Sep. 13, 2011

(54) PERMANENT MAGNET MOTOR HAVING AN AXIALLY MAGNETIZED PULL MAGNET

(75) Inventor: Vladimir V. Popov, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 430 days.

(21) Appl. No.: 12/157,265

(22) Filed: Jun. 9, 2008

(65) Prior Publication Data

US 2008/0309185 A1  Dec. 18, 2008

(30) Foreign Application Priority Data

Jun. 12, 2007 (DE) .......................... 10 2007 027 060  
Jul. 19, 2007 (DE) .......................... 10 2007 033 525

(51) Int. Cl.  
*H02K 5/24* (2006.01)  
*H02K 7/09* (2006.01)

(52) U.S. Cl. ........................................ 310/51; 310/90.5  
(58) Field of Classification Search ............... 310/51, 310/90.5  
See application file for complete search history.

(56) References Cited

U.S. PATENT DOCUMENTS

| | | | | |
|---|---|---|---|---|
| 5,235,227 | A * | 8/1993 | Fazekas .......................... 310/51 |
| 5,545,937 | A | 8/1996 | Dunfield | |
| 5,561,335 | A * | 10/1996 | Dunfield et al. ............. 310/90.5 |
| 5,587,617 | A | 12/1996 | Dunfield | |
| 5,598,048 | A * | 1/1997 | Dunfield et al. ............. 310/90.5 |
| 5,610,463 | A * | 3/1997 | Dunfield et al. ............. 310/90.5 |
| 5,619,083 | A * | 4/1997 | Dunfield et al. ............. 310/90.5 |
| 5,623,382 | A | 4/1997 | Moritan | |
| 5,683,183 | A | 11/1997 | Tanaka | |
| 5,986,365 | A * | 11/1999 | Kuwert et al. ................. 310/51 |
| 6,034,454 | A | 3/2000 | Ichiyama | |
| 6,175,174 | B1 | 1/2001 | Takahashi | |
| 6,242,826 | B1 * | 6/2001 | Saito et al. .................... 310/51 |
| 6,407,882 | B1 * | 6/2002 | Katahara et al. ........... 360/99.08 |
| 6,534,890 | B2 * | 3/2003 | Rafaelof ........................ 310/91 |
| 6,897,585 | B2 * | 5/2005 | Lee et al. ...................... 310/90 |
| 6,982,510 | B1 * | 1/2006 | Ajello et al. .................. 310/90 |
| 2005/0035670 | A1 * | 2/2005 | Chen et al. .................... 310/10 |
| 2005/0140220 | A1 * | 6/2005 | Tsuda et al. ............... 310/67 R |
| 2006/0029311 | A1 * | 2/2006 | Bausch ........................ 384/100 |
| 2006/0273674 | A1 * | 12/2006 | Aiello et al. ................... 310/90 |

FOREIGN PATENT DOCUMENTS

| | | |
|---|---|---|
| DE | 1226496 | 10/1966 |
| DE | 202004012407 | 2/2005 |
| JP | 09149586 | 6/1997 |

* cited by examiner

*Primary Examiner* — Quyen Leung  
*Assistant Examiner* — Alex W Mok  
(74) *Attorney, Agent, or Firm* — Cooper & Dunham LLP

(57) ABSTRACT

A permanent magnet motor having an axially magnetized pull magnet consisting of a baseplate on which a stator lamination stack having stator windings is disposed, wherein a hub is disposed opposite the baseplate, the hub being connected to a shaft that is supported with respect to a bearing bush via one or more fluid bearings wherein the hub carries at least one annular rotor magnet that lies radially opposite the stator lamination stack, wherein a pulling device acting in an axial direction and operating under the influence of magnetic tensile forces is disposed in the region between the hub and the stationary part of the motor, wherein the pulling device consists of a permanent magnetic pull magnet on the side of the rotor that interacts magnetically with surfaces on the side of the stator.

26 Claims, 15 Drawing Sheets

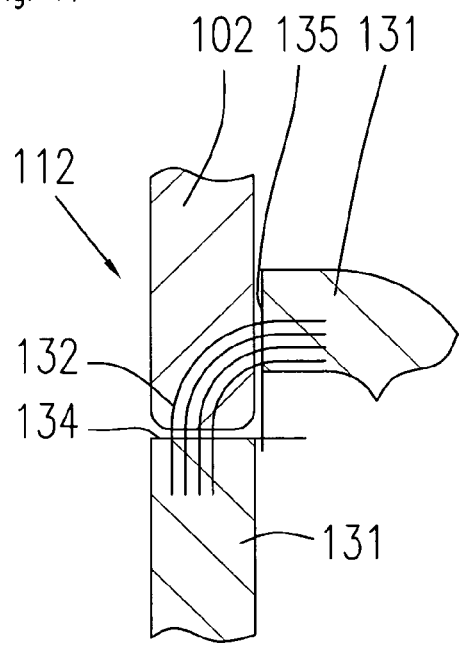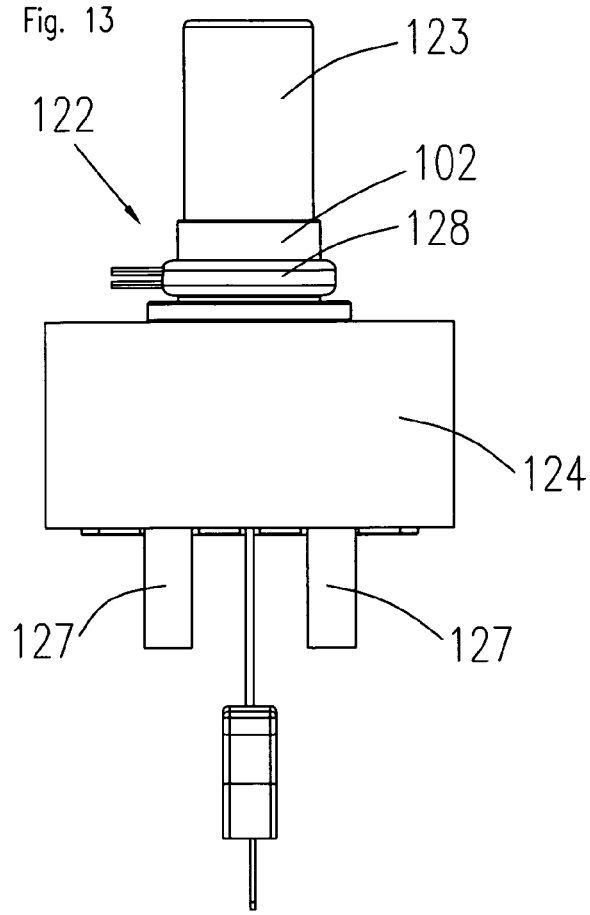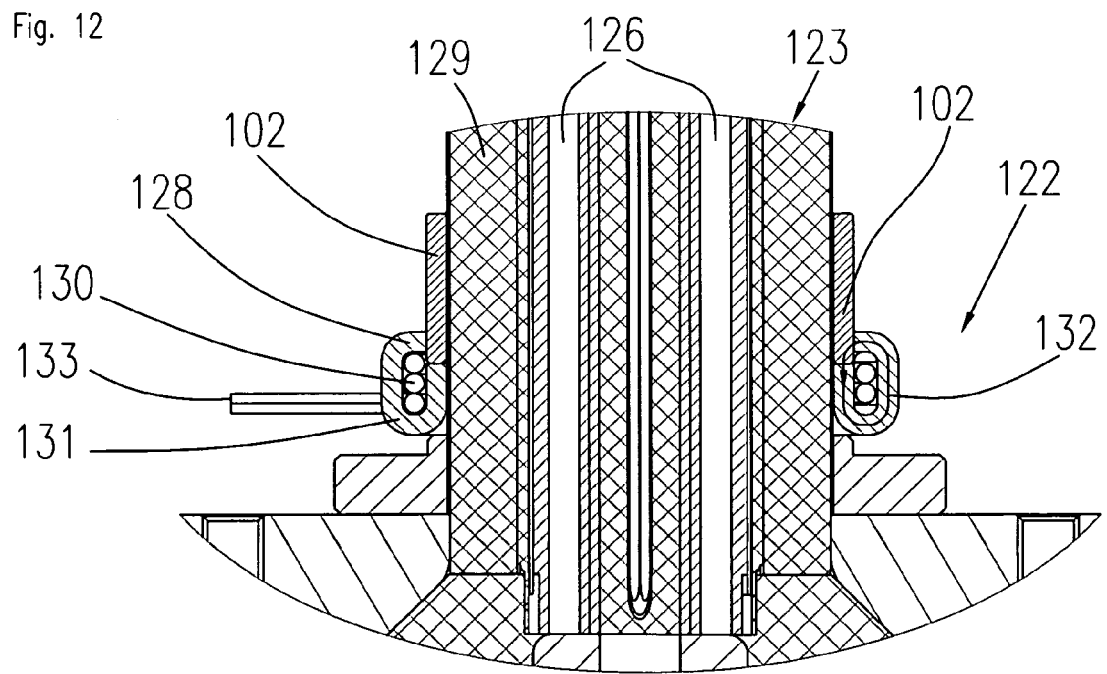

PERMANENT MAGNET MOTOR HAVING AN AXIALLY MAGNETIZED PULL MAGNET

FIELD OF THE INVENTION

The invention relates to a permanent magnet motor having an axially magnetized pull magnet. A tool is furthermore claimed as an essential component of the invention, the tool enabling a specific magnetization to be achieved in a rotor magnet of a permanent magnet motor.

DISCUSSION OF THE PRIOR ART

These kinds of permanent magnet motors have become known, for example, by way of the subject matter of JP 2005/045876 A1. In this arrangement, the pull magnet magnetized in an axial direction is fixed to the baseplate and has a spacing to the ferromagnetic hub that is bridged by an air gap. Here, the pull magnet, taking the form of a circumferential ring, is disposed in the radially outer region of the hub and the baseplate.

There is no magnetic coupling to the rotor magnet; the pull magnet is rather disposed outside the flux region of the circumferential rotor magnet. A disadvantage of the above-mentioned document is that a separate mounting space is required for installing the pull magnet in this radially outwards position, which goes to unnecessarily increase the diameter of the permanent magnet motor.

A further disadvantage is that this arrangement can only function when the hub is made of a ferromagnetic material.

The subject matter of JP 2003/061305 A1 does not include an annular pull magnet, but merely a ferromagnetic pull ring that is disposed directly below and aligned to the rotor magnet. The pull ring thus absorbs leakage flux from this rotor magnet and, owing to this leakage flux, a certain force of attraction is created between the pull ring and the rotor magnet, so that the fluid bearings used with the permanent magnet motor are preloaded in an axial direction.

A disadvantage of this embodiment, however, is found in the eddy current losses that arise in the pull ring. What is more, core losses, which reduce the overall efficiency of the permanent magnet motor, also occur in the pull ring. When the axial preload produced by the pull ring (which only develops its axial preload as a result of leakage flux from the rotor magnet) is insufficient, it then becomes necessary to additionally provide an axial offset between the magnetic center line of the stator and that of the circumferential rotor magnet. This, however, goes to produce unwelcome noise, since axial disturbing forces depending on the angle of rotation are generated which then lead to undesirable rotor vibrations.

SUMMARY OF THE INVENTION

The object of the invention is thus to avoid the disadvantages of the prior art with respect to a permanent magnet motor as described at the outset, that is to say the object is to achieve sufficient tensile force in an axial direction without any substantial eddy current losses and core losses, and at the same time to minimize any noises that may arise.

To achieve this object, the invention is characterized by a permanent magnet motor having an axially magnetized pull magnet, consisting of a baseplate on which a stator lamination stack having stator windings is disposed, wherein a hub is disposed opposite the baseplate, the hub being connected to a shaft that is supported with respect to a bearing bush via one or more fluid bearings, wherein the hub carries at least one annular rotor magnet that lies radially opposite the stator lamination stack, wherein a pulling device acting in an axial direction and operating under the influence of magnetic tensile forces is disposed in the region between the hub and the stationary part of the motor, wherein the pulling device consists of a permanent magnetic pull magnet on the side of the rotor that interacts magnetically with surfaces on the side of the stator.

Preferred embodiments and advantageous characteristics of the invention are cited in the subordinate claims.

An important characteristic of the invention is that a pull magnet is disposed at the rotor, preferably below the rotor magnet, the pull magnet being in magnetic interaction with the part located at the stator that may take the form, for example, of a pull ring disposed below and aligned to the pull magnet.

This technical teaching provides the advantage that a pull magnet is fitted in a small mounting space, namely directly under the rotor magnet. This kind of pull magnet preferably takes the form of a permanent magnet magnetized in an axial direction that is preferably annular or disk-like in shape.

In another preferred embodiment, however, it is provided that instead of a continuous disk or a continuous ring, individual ring segments are provided; it being assumed, however, that all the ring segments or pieces are magnetized in an axial direction. This magnetization could be so devised, for example, that the topside is polarized circumferentially as the south pole and the underside circumferentially as the north pole.

This technical teaching provides the advantage that a strong tensile force component can be generated in an axial direction in a small mounting area. It is even possible to dispense with a pull ring located at the stator, as required in the prior art. In its first embodiment, the invention provides for a pull ring to be available, whereas in a second embodiment the pull ring is omitted.

When a pull ring is available, eddy current and core losses are largely avoided. That is to say, the field is introduced homogeneously in a perpendicular direction onto the surface of the pull ring, and, owing to this perpendicular, homogeneous introduction, a homogeneous field distribution is produced without any field alternation that would result in eddy currents.

Moreover, core losses are avoided since there are no alternating fields. This leads to the next important advantage that disturbing noises are now also eliminated, since, according to the invention, the offset between the stator and the rotor magnet can be omitted, because the axial force generated by the pull magnet according to the invention is so large that an additional offset can be dispensed with. The offset now omitted, however, had the above-described disadvantage of producing undesirable noise developments, which according to the invention now no longer occur.

The absence of core losses and the reduction in eddy currents result in an improved overall electrical efficiency of the motor, since undesirable braking torque is avoided, which would otherwise have to be tolerated when eddy currents are generated.

Moreover, the air gap between the circumferential pull magnet and the stationary pull ring can be considerably reduced, since eddy currents no longer exist and will no longer be produced. Previously—in the prior art—the air gap had to be made relatively large so that, due to the very size of the air gap, the event of eddy currents could be avoided. Since now, according to the invention, no eddy currents occur from the outset, the air gap can be made smaller. Hence, given a smaller air gap, larger axial forces are made possible, which in turn allows—as explained above—the offset between the stator and the rotor magnet to be omitted.

In another embodiment of the invention, it can be provided that instead of a circumferential pull magnet taking the form of a ring, individual ring segments are provided.

Instead of segments of a circle or sections of these segments, tablet-shaped, punctiform or tubular permanent magnets may also be used that are distributed piecewise around the circumference. Further embodiments, however, are also conceivable.

In a development on the present invention, provision can also be made for the pull ring, which is aligned with the pull magnet, to be omitted. In this case, advantage is taken of the ferromagnetic properties of parts of the stationary part of the motor.

In a preferred first embodiment, it is preferable if the pull magnet, which may be designed in accordance with the above-mentioned embodiments, is disposed in the interior of the circumferential hub in the region of a recess and oriented with its active end face to the laminated sheet metal stack of the stator. This leads to the important advantage that the hub need not be made of a ferromagnetic material, but rather of any other optional material (e.g. aluminum or plastics). A very large axial tensile force is nevertheless thus generated, since advantage is now taken of the ferromagnetic properties of the stator lamination stack that has to be in place anyway. This makes it possible to achieve a favorable mounting space together with a favorable tensile force.

In a first embodiment of this invention provision is made for the pull magnet to be disposed radially inwards on the inside surface of the hub in interaction with the topside of the stator lamination stack.

In the second embodiment of the invention provision is made for the pull magnet to be likewise disposed on an inside surface of a recess in the hub, though interacting with the radially outer surface of the stator lamination stack.

Both embodiments assume that an appropriate recess and an appropriate mounting space are available in the hub.

The mounting space for the stator winding in the hub is namely used in an inventive manner, i.e. in the region of the winding of the stator stack, the hub should always have a recess and, in the region of this recess, the said pull magnet is inserted either radially inwards or radially outwards.

The generation of an axial tensile force in this region in turn has the advantage of the tensile force being so large that the offset between the stator and the rotor magnet, previously identified as disadvantageous, can be dispensed with, hence the air gap between the pull magnet and the surface of the stator lamination stack may also be kept very small, thus ensuring very high axial forces for a small mounting space together with the prevention of eddy current losses.

A particular advantage in avoiding noise development occurs when the pull magnet is disposed radially inwards in the recess in the hub and acts on the radially inwards oriented active surface of the stator lamination stack. It is thereby very close to the rotational center and any tilting play of the hub is prevented in an especially favorable manner, since very high axial forces are exerted in this region.

It is therefore important that the pull magnet is disposed on a short lever arm in the direction of the rotational axis of the motor, since in the radially outer region of the hub buckling can occur which could also impair the storage disks mounted there.

In realizing an alternative preferred embodiment of the invention, the following insights are important: the forces that act on a conventional ferromagnetic pull ring on the side of the rotor magnet can be divided into two different components. A first component consists of reluctance forces, which pull the pull ring in the direction of the rotor. A second component consists of Lorentz forces, which, owing to eddy currents, arise in the pull ring and which tend to push the pull ring away from the rotor magnet. The two forces are directed against each other, the Lorentz forces weakening the reluctance forces.

The reluctance forces of the first component depend on the permeability of the pull ring material. The active forces (Lorentz forces) of the second component basically depend on the electrical conductivity of the material, on the intensity of the alternating field and on the rotational speed of the rotor. The latter Lorentz forces, which are caused by eddy currents, produce additional vibrations that make the motor run less smoothly. In addition, these eddy currents cause extra electric motor losses. Rough running can become critical when the motor reaches a specific rotational speed, wherein the second force component dominates and the rotor is lifted up. This eventually destroys the preload in the fluid bearings which greatly impairs their load-carrying capacity.

The aim of the invention is to thus avoid the above-mentioned disadvantages.

According to the alternative preferred embodiment of the invention, it is provided that at least one end face, preferably the lower region of the rotor magnet, which is preferably at least partly outside the range of influence of the stator stack, is formed as a circumferential magnetic region magnetized uniformly in an axial direction.

This technical teaching now provides the important advantage that the rotor magnet no longer consists solely of a plurality of magnetic poles distributed evenly about the circumference and magnetized alternatively in a radial direction, but rather that, in addition,—according to the invention—an end region of the rotor magnet is formed as an own differently magnetized magnetic region that is magnetized axially at its lower end face (circumferentially or at least piecewise).

This gives rise to the important advantage that separate magnet rings can now be dispensed with. According to the invention, such a magnet ring is integrated in the material of the rotor magnet and thus need not be manufactured and mounted as a separate part. This goes to greatly reduce the manufacturing costs of this kind of permanent magnet motor. Owing to the axial magnetization of an own magnetic region at the end face of the rotor magnet, the effect of a ferromagnetic pull ring is incidentally made considerably stronger.

The axial magnetization in the lower end face region of the rotor magnet directed preferably downwards towards the pull ring now ensures a much improved tensile force and, consequently, a much larger preload acts on the fluid bearing than was available in the prior art. This improvement applies particularly to motors having a rotor magnet that do not have a further magnetic region magnetized in an axial direction. These motors were only provided with magnetization in a radial direction which means that the effect on a pull ring disposed underneath in an axial direction was very low. In the prior art, this effect was only produced by leakage flux, so that this effect lags far behind the effect of an own magnetic region magnetized in the region of the end face of the rotor magnet.

Moreover, in the prior art, the rotor magnet had to be mounted with an axial offset to the stator stack in order to gain an additional axial force component and thus ensure a sufficient axial preload of the fluid dynamic axial bearing. A disadvantage here, however, is that this offset incites vibrations thus resulting in a worsening of the acoustic properties of the motor.

The magnetic region according to the invention disposed in the region of the end face of the rotor magnet is a unipolar magnetized region which extends annularly at the underside of the rotor magnet, is rotationally symmetric, is preferably directed axially downwards in its direction of magnetization, and which is at least partially enclosed by a ferromagnetic back yoke. This ferromagnetic back yoke ensures the redirection of the radial field component in an axial direction.

Here, it is preferable if the flux lines of this region do not extend into the main flux region of the stator and the rotor magnet so as to avoid any impairment there.

Such an axially polarized magnetic region can therefore be combined with a conventional ferromagnetic pull ring.

In another embodiment, however, the pull ring may also be dispensed with. Provided that the part lying opposite the axially magnetized magnetic region, such as a baseplate or a flange on which the motor is mounted, has ferromagnetic properties, the magnetic region magnetized in an axial direction in the direction of this part likewise develops a corresponding tensile force, thus resulting in the desired preload of the fluid bearing.

Incidentally, it has been known to avoid eddy currents by providing a relatively large distance between the end face of a conventional rotor magnet and the associated surface of the baseplate or of the pull ring respectively. This large air gap is meant to reduce eddy currents since, owing to this large distance, weaker magnetic field alternation occurs.

Since, according to the invention, such eddy currents no longer occur due to the magnetization of the region of the end face of the rotor magnet as a unipolar magnetic region having a magnetic field directed in an axial direction, it is now made possible for the first time to distinctly decrease the air gap in this region. This goes to greatly increase the axial preload force that is exerted here. Thus, it is now possible for the first time to totally dispense with the previously required offset between the rotor magnet and the stator, which greatly improves the dynamic of the motor and, in particular, also greatly minimizes noise.

This makes it possible to align the rotor magnet—seen magnetically—precisely centric to the stator, thus allowing the motor to run more smoothly without any substantial axial vibrations.

Further embodiments of the invention consist of the upper region of the end face of the rotor magnet having, additionally or alternatively, an axially magnetized region and that this region or these regions is/are respectively disposed opposite one or more ferromagnetic pull rings.

A further embodiment of the invention can be seen in that a permanent magnet ring magnetized axially in the opposite direction is disposed opposite the region of the end face of the rotor magnet. Here, the permanent magnet ring may be disposed on the topside or on the underside of the rotor magnet. This magnetic axial bearing is compensated by a counter bearing. This counter bearing may be an axial fluid bearing or a further magnetic bearing that is formed, for example, by an axial magnetic offset between the rotor magnet and the stator stack. Another possibility for a magnetic counter bearing is to create a purely magnetic double axial bearing having two axially permanent magnet rings magnetized in opposite directions disposed on the topside and the underside of the rotor magnet, the rotor magnet having on its topside as well as on its underside axially magnetized end face regions.

In a further development on the present invention, separate protection is claimed for a magnetizing device that is used for magnetizing the above-mentioned magnetic region in the region of the end face of the rotor magnet.

It is here claimed that an essential component of the invention consists of a special magnetizing coil being slid onto the coil shaft of a conventional magnetizing device, the special magnetizing coil acting only on the region of the end face of the annular rotor magnet. Furthermore, the special magnetizing coil may also form an integral part of the magnetizing device.

In this way, using only one single production process, the rotor magnet can be radially magnetized to north and south poles and at the same time the end face of the rotor magnet can be magnetized so that it is circumferentially and unipolarly magnetized in an axial direction.

The subject matter of the present invention is not only derived from the subject matter of the individual patent claims but also from any combination of the individual patent claims.

All the details and characteristics revealed in the documents, including the abstract, and particularly the spatial designs represented in the drawings, are claimed to be essential to the invention, to the extent that they are new vis-à-vis the prior art, either individually or in any combination.

The invention is explained in more detail below on the basis of drawings representing only one possible embodiment. Further essential characteristics and advantages of the invention can be derived from the drawings and their description.

BRIEF DESCRIPTION OF THE DRAWINGS

The figures show:

FIG. 11: a side view of the magnetizing tool FIG. 12: an enlarged section through the magnetizing region of the magnetizing tool FIG. 13: the flow of flux through the rotor magnet as a pull magnet

DESCRIPTION OF PREFERRED EMBODIMENTS OF THE INVENTION

Figure 1:
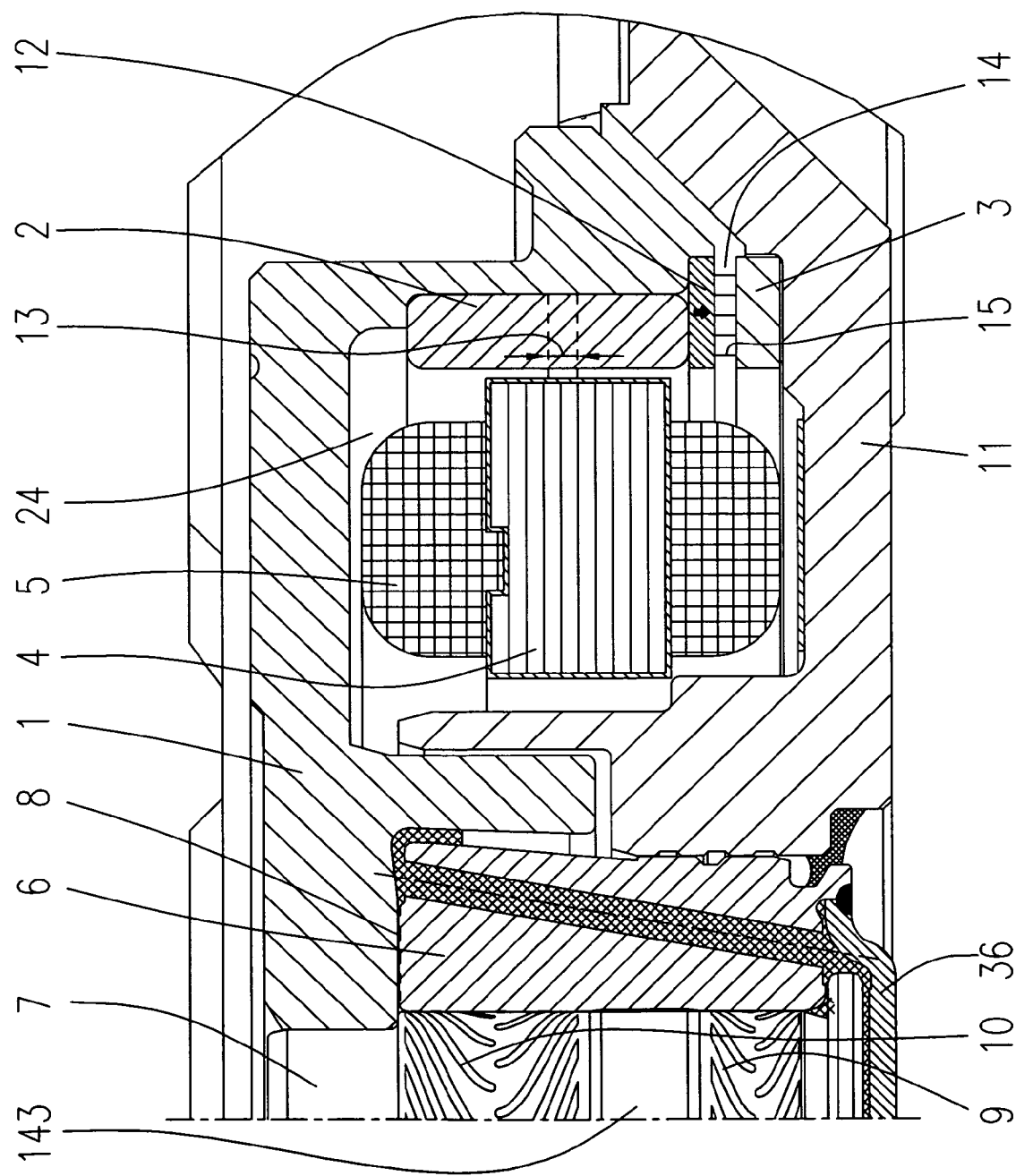
FIG. 1: a section through a part of a permanent magnet motor

In FIG. 1, a standard construction for a permanent magnet motor is represented, wherein in the region of a circumferential hub 1, a rotor magnet 2 is disposed in the region of a recess 24.

Using a well-known method, a shaft 7 is fixedly connected to the hub 1 and forms an upper axial bearing 8 in its upper region in the direction of the bearing bush 6 and has besides two radial bearings 9, 10 disposed at a spacing from one another.

The stator arrangement is disposed in the region of a baseplate 11, the stator arrangement being made up of a stator lamination stack 4 in which stator windings are disposed.

It is important that the stator windings 5 extend into the recess 24 in a well-known manner, because this recess must always be available in the hub 1 for production engineering purposes.

In order to generate an additional axial preload, a pull ring 3 is provided, the pull ring 3 being disposed as a circumferential ring on the baseplate 11 and being made of a ferromagnetic material. This kind of ferromagnetic material may include iron or an iron alloy or electric sheets.

Figure 2:
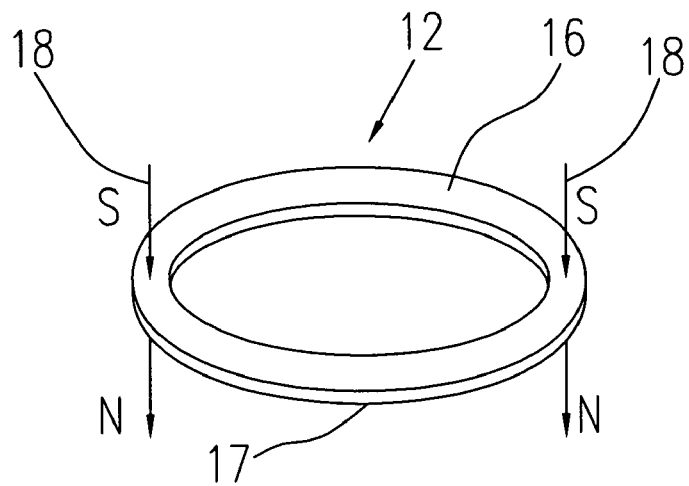
FIG. 2: a first embodiment of a pull magnet

According to the invention, a pull magnet 12 is now disposed below the rotor magnet 2—and connected to the latter using, for example, a bonded joint—the pull magnet 12 being designed in a first preferred embodiment according to FIG. 2 as a circumferential ring. It can be seen from FIG. 2 that the ring has a topside 16 and an underside 17 and that the flux lines 15, which are generated by the ring, flow from the top to the bottom, so that at the topside, for example, circumferential south and at the underside circumferential north is always formed. This goes to define a direction of magnetization 18 in an axial direction.

Figure 3:
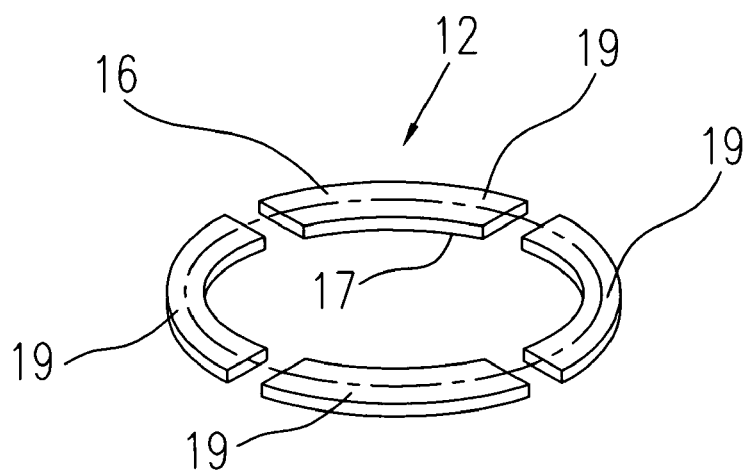
FIG. 3: a second embodiment of a pull magnet

Instead of this kind of pull magnet 12, individual segments 19 of such a ring may be provided, as illustrated in FIG. 3.

Figure 3A:
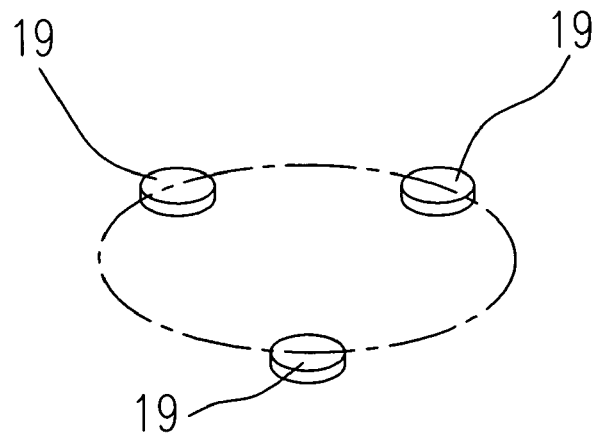
FIG. 3*a*: a third embodiment

As an alternative, FIG. 3*a* shows that separate permanent magnet pieces can also be provided, which may, for example, be cylindrical or punctiform or cuboid in shape.

At all events, they should be distributed at regular intervals evenly about the circumference of the hub.

In the prior art, it is known for an offset 13 to exist between the magnetic center line of the stator 4 and the rotor magnet 2, so as to generate an additional axial preload on the axial bearing 8. According to the invention, this offset 13 may also be dispensed with (but need not be), because now, owing to the arrangement of the pull magnet 12 directly opposite the pull ring 3, a sufficiently strong axial tensile force is generated in accordance with FIG. 4, which acts, for example, on the rotor in the direction of arrow 21.

Figure 4:
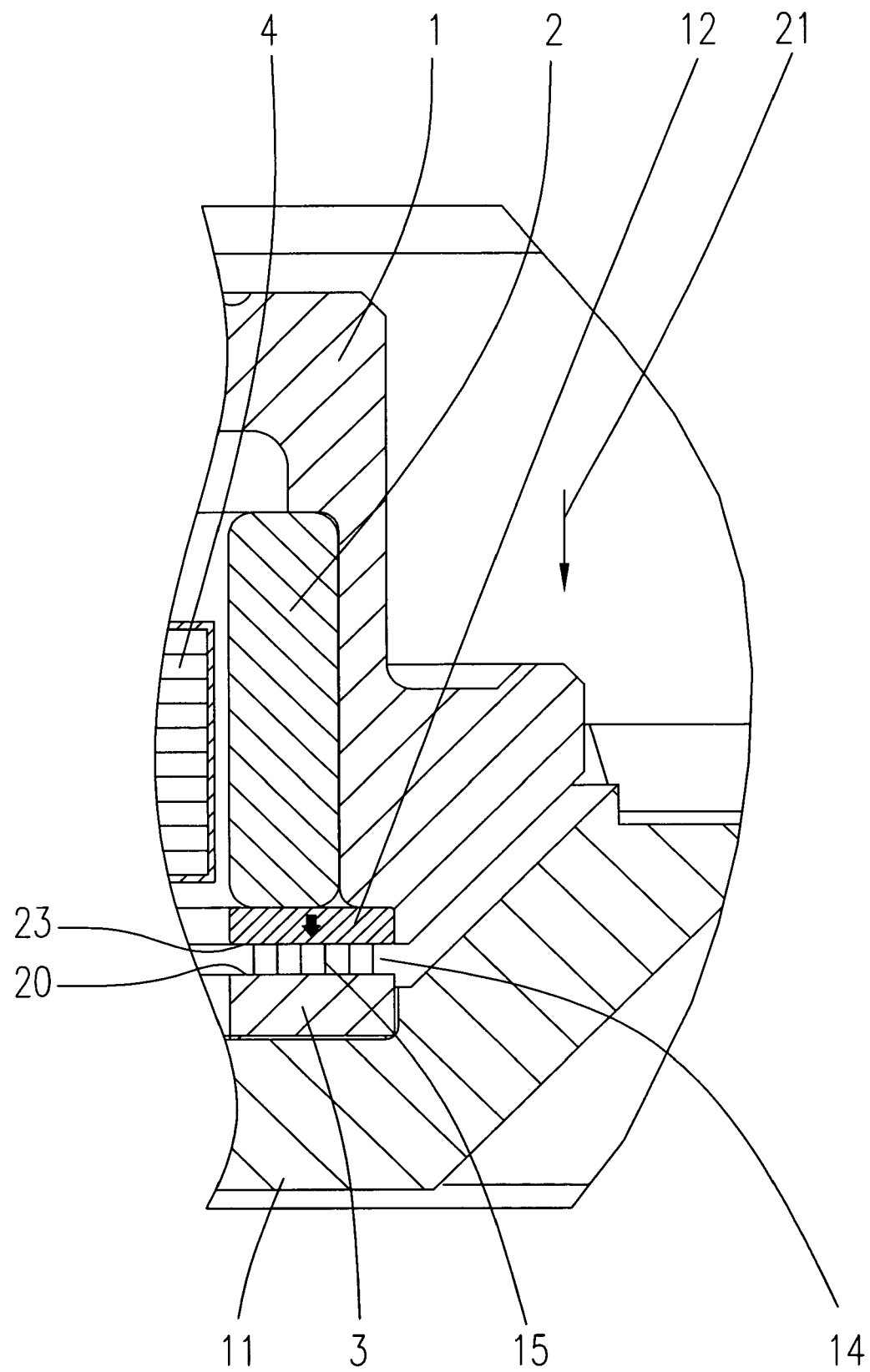
FIG. 4: a section through the first embodiment of the motor having a pull magnet and pull ring

It can be seen from FIGS. 1 and 4 that the flux lines 15 generated in the pull magnet 12 emerge almost perpendicularly from surface 23 and enter surface 20 at the pull ring 3 mainly perpendicularly. This axial magnetization delivers high flux homogeneity, resulting in a considerable reduction of eddy currents as well as core losses in the pull ring and thus in an improvement in the efficiency of the electric motor.

This makes it possible for the first time to distinctly decrease the size of the air gap 14, which previously had to be made relatively large in order to avoid the harmful effects of eddy currents.

Figure 5:
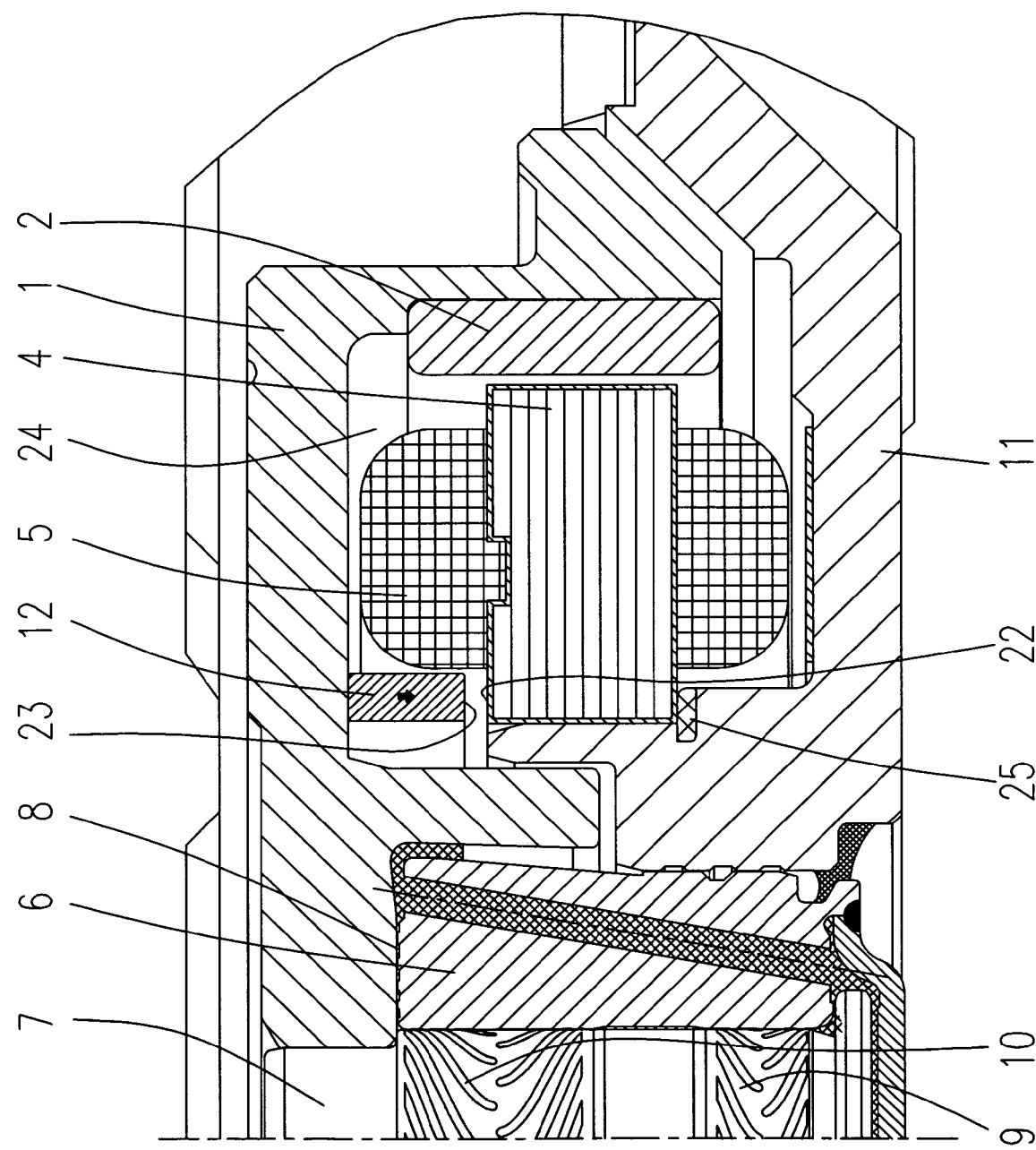
FIG. 5: a section through a second embodiment of the motor having a pull magnet without a pull ring
Figure 6:
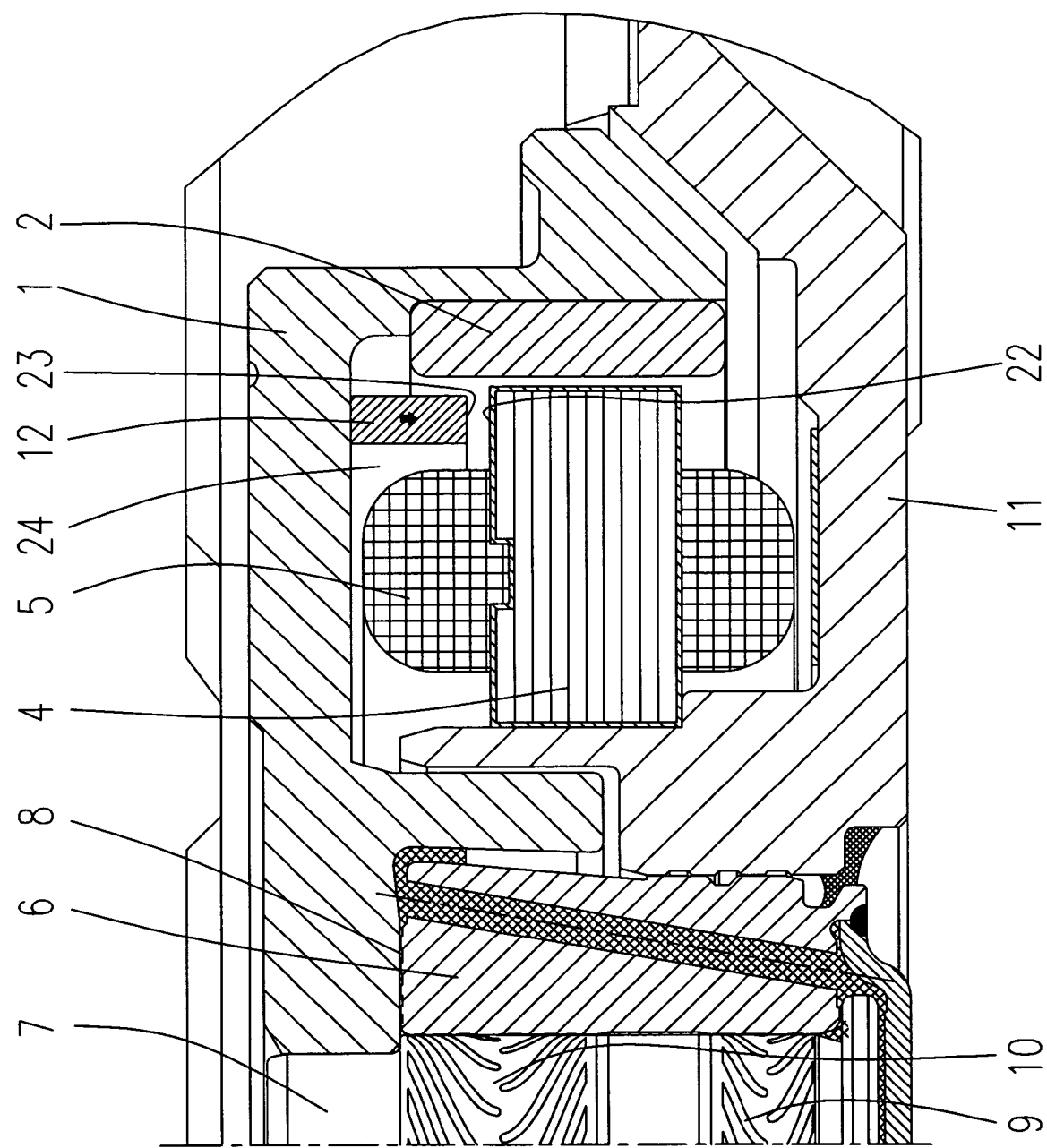
FIG. 6: a section through a third embodiment of the motor having a pull magnet without a pull ring

FIGS. 5 and 6 show that the pull ring 3 could also be omitted, and that the pull magnet 12 could also be installed in other positions in the rotor. It can, of course, take on the form of the embodiments that were described with reference to FIGS. 2 to 3*a*.

The embodiment according to FIG. 5 shows that the pull magnet 12 is disposed specifically in the radially-inwards region of the recess 24 in the hub 1 with its active surface 23 being located opposite the surface 22 of the stator lamination stack 4. If the stator lamination stack 4 is additionally held in the baseplate 11 by an elastic damping material on its underside, such as a sealing compound 25, then any vibrations incited by the pull magnet 12 will be dampened.

The increased axial tensile force of the design according to the invention means that the offset 13 may be dispensed with and the pull ring 3 may likewise be omitted here.

FIG. 6 shows an alternative to FIG. 5 in which the pull magnet 12 is disposed in the radially outer region of the hub in the region of the recess 24. Here, of course, some sort of influence from the rotor magnet 12 has to be envisaged. This depends, however, on the mounting dimensions and sections. This embodiment, however, lies likewise within the scope of the present invention.

Figure 7:
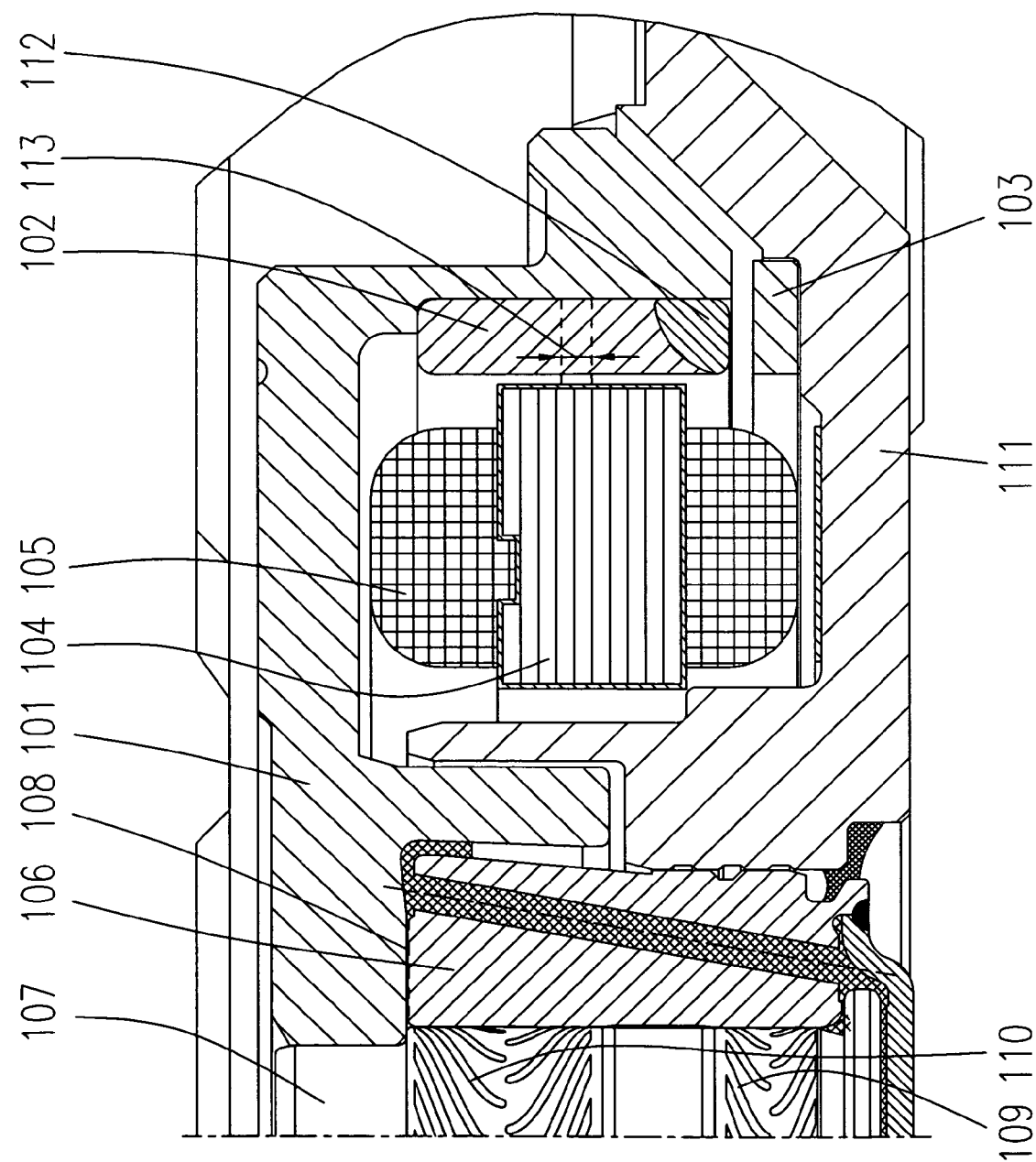
FIG. 7: an enlarged partial section through a modified embodiment of a permanent magnet motor

In FIG. 7, a partial section through a further embodiment of a permanent magnet outer rotor motor, similar to that in FIG. 1, is shown, in which a shaft 107 is fixedly connected to a hub 101 and the shaft has two radial bearings 109, 110 disposed at a distance from one another and connected to an axial bearing 108. The bearings 108, 109, 110 are disposed in a bearing bush 106. The invention may be accordingly realized for an inner rotor motor without any reservation.

It goes without saying that the radial bearings 109, 110 may be disposed on the shaft 107 itself rather than on the bearing bush 106. It is additionally possible to use bearing patterns other than the illustrated herringbone-shaped radial bearing patterns 109, 110, such as so-called lobe patterns in the way of a "lemon bearing" or a multi-face slide bearing, or even to have a slide bearing without any radial bearing patterns 109, 110. Moreover, alongside a bearing bush 106 made of steel, a bearing bush 106 made, for example, of sinter material may also be used. Likewise, axial bearing patterns may be provided on the underside of the hub 101, which lie opposite the topside of the bearing bush 106.

A stator stack 104 is fixed to a stationary baseplate 111, the stator stack 104 consisting substantially of a laminated sheet metal stack and an associated stator winding 105.

In order to generate a magnetic axial force, a pulling device is provided that consists substantially of a ferromagnetic pull ring 103 that is fixedly connected to the baseplate 111. Should the baseplate 111 itself be made of a ferromagnetic material, the pull ring 103 may be dispensed with.

The rotor magnet 102 is disposed opposite the pull ring 103, the rotor magnet 102 being fixed to the inside surface of the circumferential hub 101. The hub 101 itself does not have an additional yoke but is preferably made of a ferromagnetic material, thus forming the magnetic yoke.

In case the hub 101 is not made of a ferromagnetic material, a ferromagnetic yoke may still be disposed in the region located radially outwards of the rotor magnet 102.

There is an axial offset 113 between the stator and the rotor magnet 102. This means that the magnetic center line of the stator 104 does not lie at the same level as the magnetic center line of the rotor magnet 102, and that there is an axial offset 113 between these two lines.

In contrast, for example, to FIG. 1, in this embodiment the region of the end face of the rotor magnet 102 facing the pull ring 103 is formed as a separately polarized magnetic region 112 and has unipolar circumferential magnetization. As is still to be described later with reference to FIG. 8, this means that the width of the air gap 114 between the underside of the rotor magnet 102 and the pull ring 103 can be reduced considerably, wherein the axial tensile force between the rotor magnet 102 and the pull ring 103 is increased thus making the axial offset 113 unnecessary, which results in a lessening of the acoustic noise level of the motor.

Figure 8:
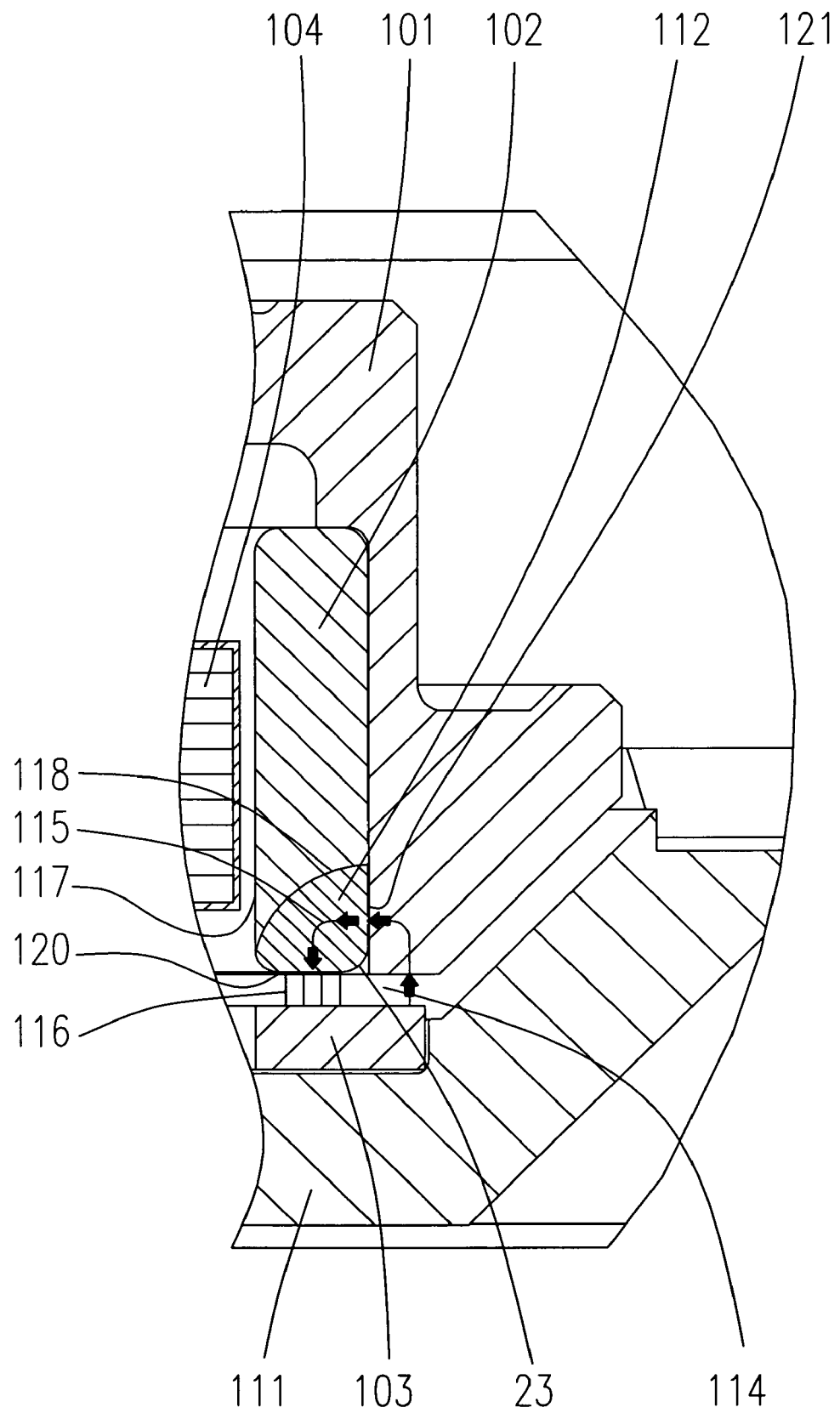
FIG. 8: an enlargement of FIG. 7 in the region of the rotor magnet

In FIG. 8, further details of the characteristics of the flux lines of the new magnetic region 112 of the rotor magnet 102 are shown. Here it can be seen that, starting from the horizontal inside surface of the pull ring 103, the flux lines enter perpendicularly into the downwards-oriented surface of the rotor 101 and extend in an arc to the radially outer (vertical) outside surface 121 that is polarized, for example, as a south pole. From here, the flux lines 115 again flow arc-shaped through the material of the magnetic region 112, the pull ring 103 lying axially opposite the unipolar magnetized magnetic region 112 of the rotor magnet 102 and at least a partial region of the back yoke as well.

The flux lines ideally emerge perpendicularly from the underside 120 of the magnetic region 112 and form flux lines 116 flowing approximately perpendicular in the direction of the topside of the pull ring 103. This goes to ensure that a homogeneous magnetic field is active not only between the underside of the rotor magnet 102 and the pull ring, but also between the pull ring and the back yoke. In this way, a greater axial force is attained.

The contact surface 118 of the magnetic polarization of the magnetic region 112 within the rotor magnet 102 is preferably chosen such that it does not fall in the region of the active surface 117 between the stator 104 and the region of the rotor magnet 102 magnetized in a radial direction.

This magnetic region 112 should therefore preferably be placed outside the flux line region acting in a radial direction, so as to disturb the flux line region of the main magnetic flux as little as possible.

Figure 9:
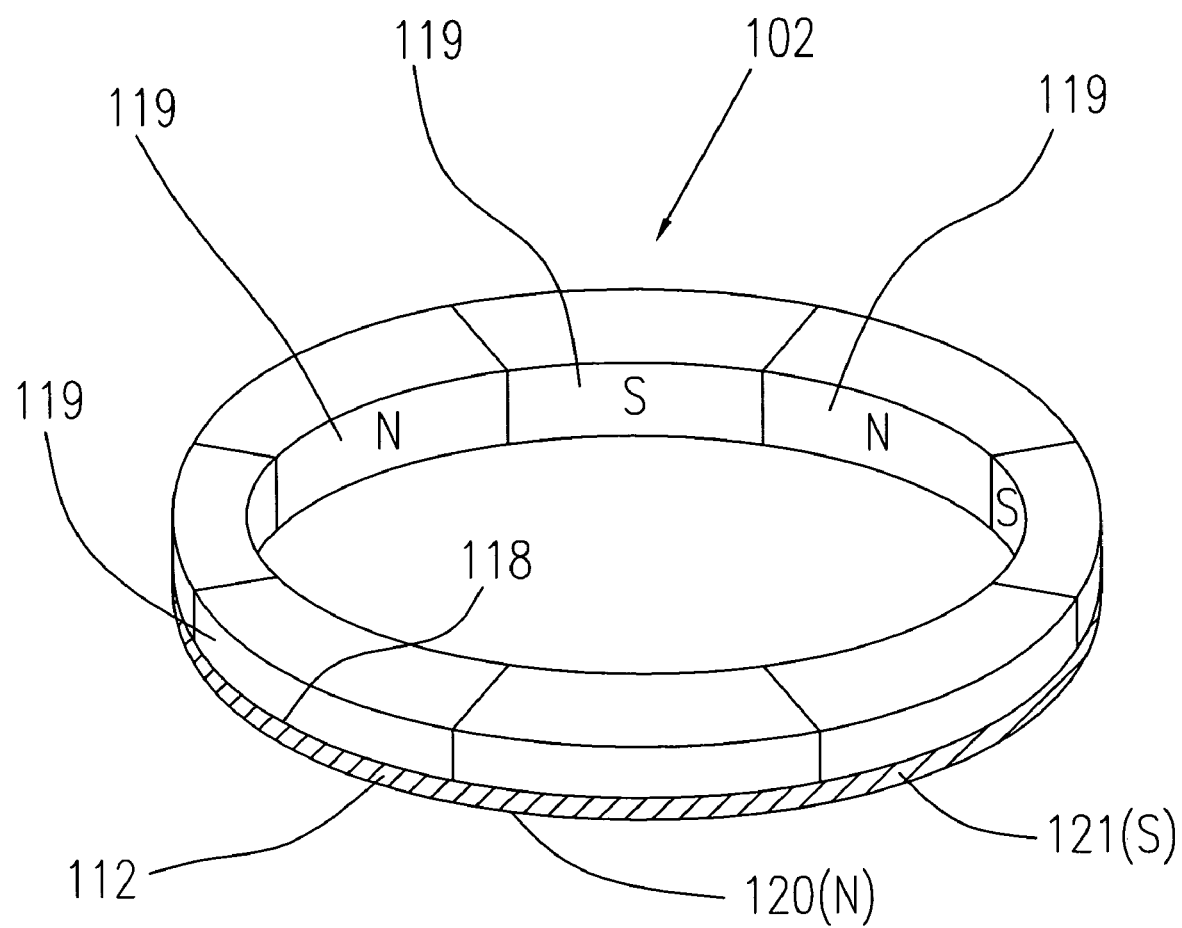
FIG. 9: a first embodiment of a rotor magnet as a pull magnet seen in perspective
Figure 10:
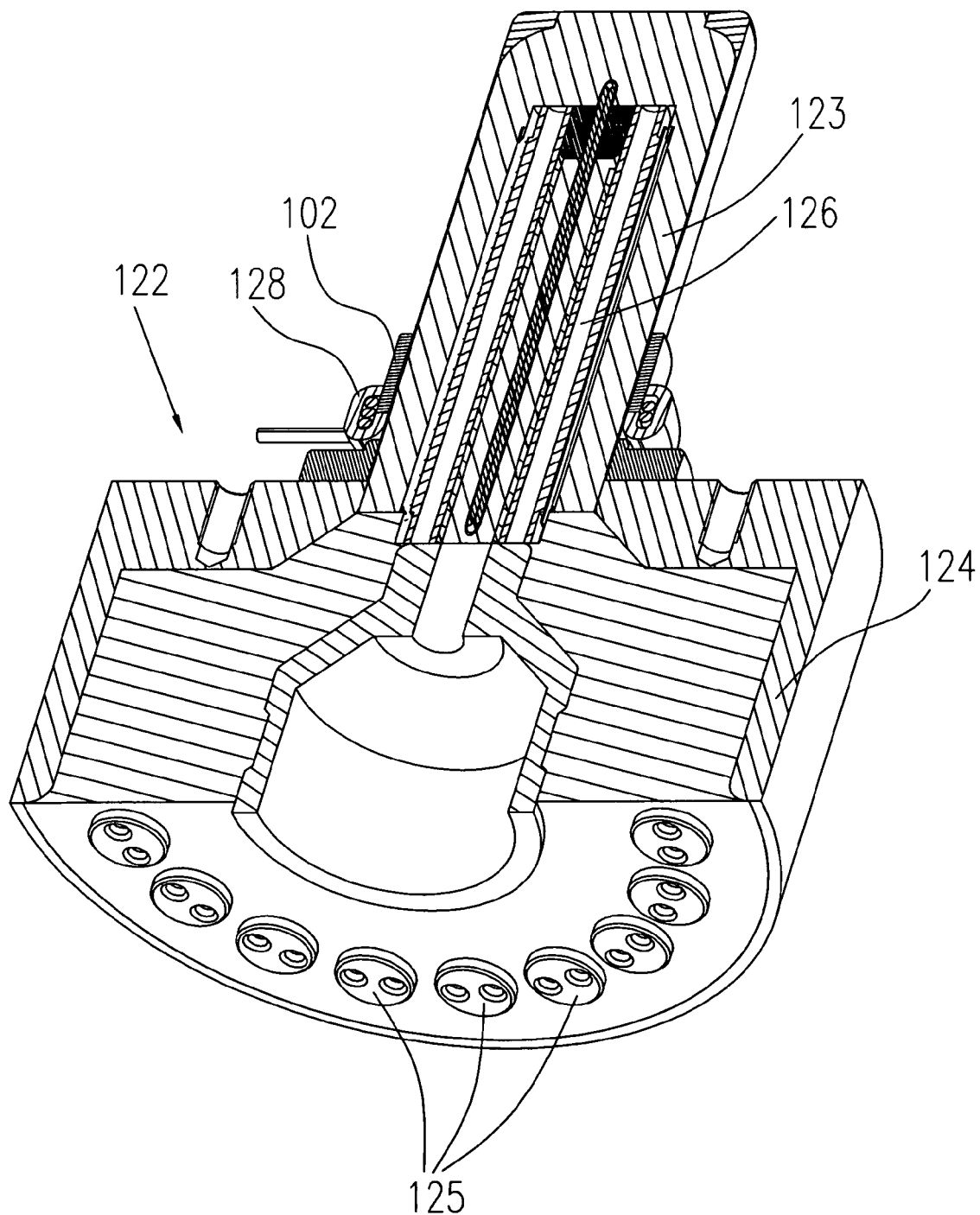
FIG. 10: a section through a magnetizing tool

FIG. 9 shows a schematic view of a rotor magnet 102 designed according to the invention in which a plurality of magnetic poles 119 are evenly distributed about the circumference and always alternatively magnetized radially inwards. According to the invention, a region of the end face of the rotor magnet 102 forms the circumferential magnetized magnetic region 112, wherein the outside surface 121, for example, is formed as a circumferential south pole and the underside 120 as a circumferential north pole.

With reference to FIGS. 10 to 16, a magnetizing device 122 for magnetizing the described rotor magnet 102 is separately claimed as an essential component of the invention, which should have the benefit of separate protection independent of the above-mentioned embodiments of FIGS. 7 to 9. It should, however, also have the benefit of protection in combination with the embodiments in accordance with FIGS. 7 to 9.

The magnetizing device 122 consists substantially of a coil shaft 123 on which the rotor magnet 102 to be magnetized or the material to be magnetized is placed. To establish appropriate magnetization, magnetizing coils having magnetizing wires 126 are laid loop-like in the shaft interior. Contact for the magnetizing wires 126 is established using contact sockets 125 and a main connector socket 127 as shown in FIG. 13. Sealing compound is disposed in socket 124.

In FIGS. 11 to 13 further details of the magnetizing device 122 can be seen. The important thing is that a special magnetizing coil 128 is slid onto the outside circumference of the shaft 123 of the device 122 and, in accordance with FIGS. 14 to 16, forms in cross-section an approximately C-shaped flux guide piece 131 that encloses the magnetization wires 130 disposed in the interior.

In accordance with FIG. 12, the end face of the rotor magnet 102 is inserted between the ends of the flux guide piece 131 into the interior of the special magnetizing coil 128, so that the end face 134 of the C-profile of the flux guide piece 131 engages against the outside surface of the rotor magnet 102 in its lower region. The other end face 135 of the flux guide piece 131 lies perpendicular to the first-mentioned end face 134, so that the two end faces are disposed at an angle of 90° to one another.

FIG. 11 shows that during the magnetization process, the flux lines 132 emerge almost perpendicularly from the end face 135 of the approximately toroid flux guide piece 131 of the special magnetizing coil 128 and pass almost circularly through the material of the rotor magnet 102 and magnetize this region in the manner illustrated, thus forming the described magnetic region 112. The flux lines 132 emerge almost as normal from the opposite end face of the rotor magnet 102 and enter almost as normal into the surface of the end face 134 of the flux guide piece 131.

It is worth adding that this special magnetizing coil 128 is provided with its own coil connectors 133 into which a separate magnetizing current is fed.

The magnetizing device 122 and the special magnetizing coil 128 may also be formed integrally as one piece. Furthermore, a short circuit coil can also be located within the torus, the short circuit coil ensuring a homogeneous magnetic field distribution.

As an alternative, both magnetizing coils 126 and 128 can be connected electrically in parallel or in series. It is additionally possible to use a choke coil to limit the current of the special magnetizing coil 128, the choke coil being connected electrically in series to the special magnetizing coil 128.

The last described embodiment of the invention provides the advantage that a separate magnetic region 112 is provided in a rotor magnet 102 without need of any separate auxiliary parts, the magnetic region 112 being polarized in an axial direction and made circumferential so as to thus create the effect of an own magnet ring and to improve the effects of a pull ring 103.

The surprising effect emerging is that, with an appropriate adjustment of the magnetizing current flowing through the special magnetizing coil 128, the rotor magnets 102 magnetized in this way do not form any significant magnetic pole on their radially outer surface, thus making it no longer necessary to have a magnetic back yoke there.

Figure 14:
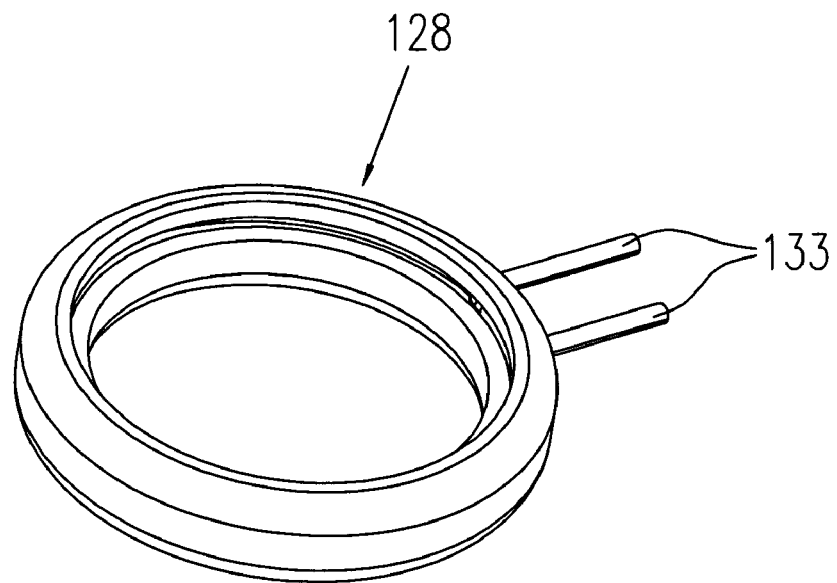
FIG. 14: the magnetizing coil seen in perspective
Figure 15:
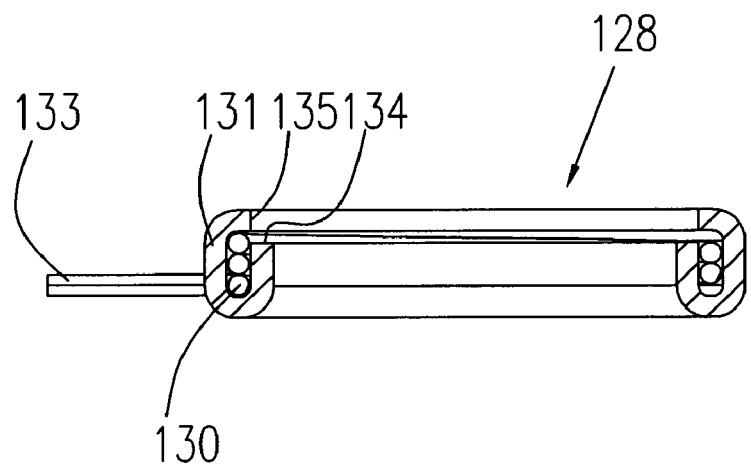
FIG. 15: section through the magnetizing coil according to FIG. 14
Figure 16:
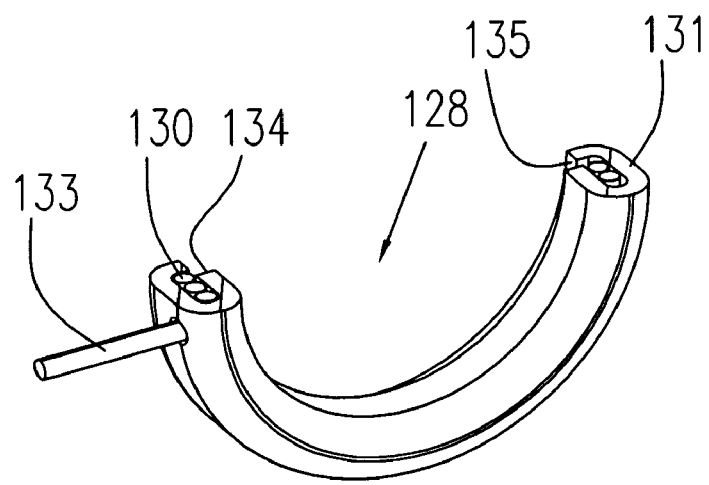
FIG. 16: perspective section through the magnetizing coil

In FIGS. 14 to 16, the construction of the special magnetizing coil 128 is illustrated. FIG. 15 shows in cross-section the magnetization wires 130 as well as the flux guide piece 131 of the special magnetizing coil 128 being approximately toroid in shape.

Figure 17:
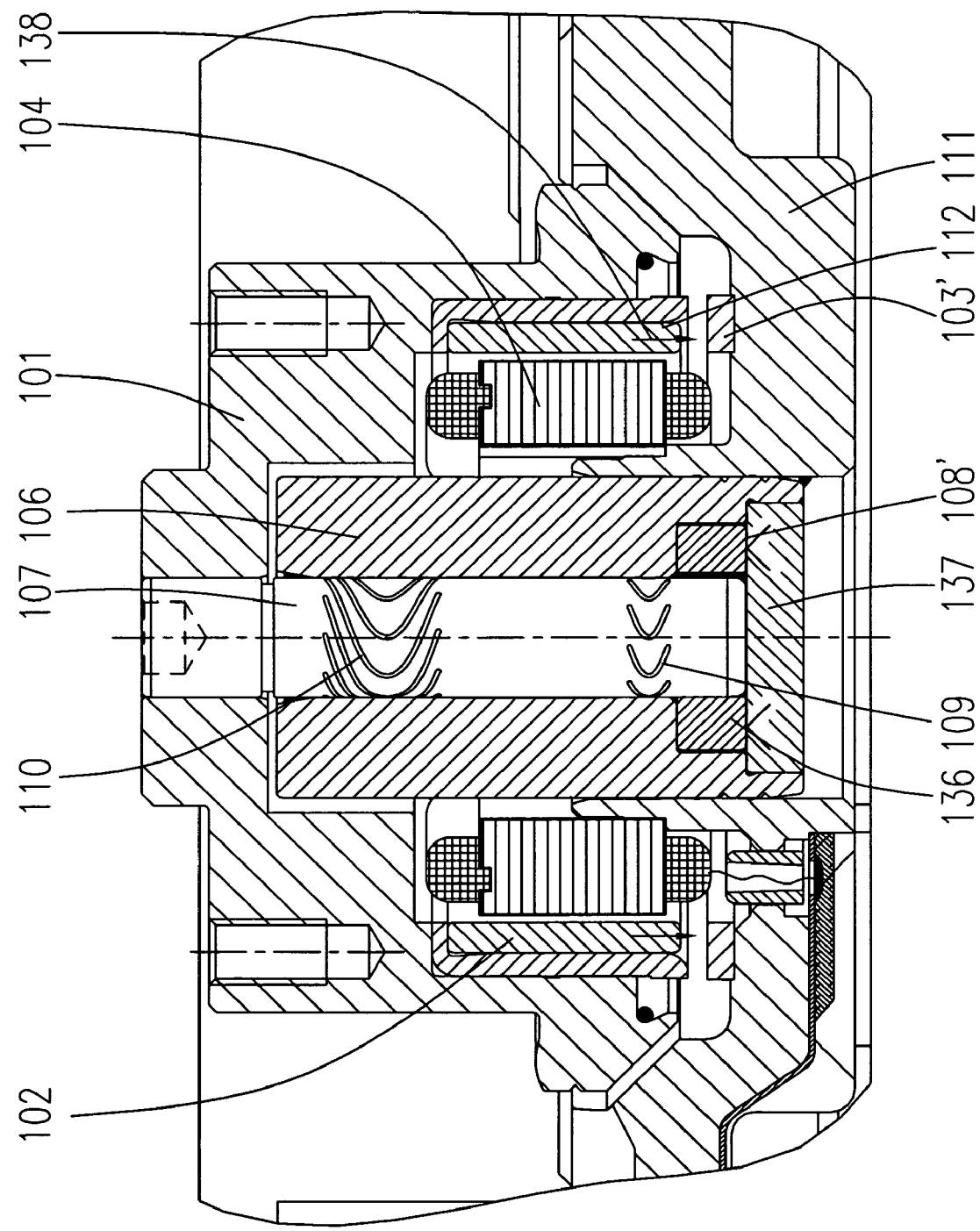
FIG. 17: section through a fluid-supported spindle motor having a fluid axial bearing between the shaft and counter plate

FIG. 17 shows a further embodiment of a fluid-supported spindle motor for driving a hard disk drive having an upper and a lower radial bearing 109, 110 and a fluid axial bearing 108' that is disposed between the thrust plate 136 connected to the shaft 107 and the counter plate 137, preferably on the surface of the counter plate 138, and that generates an upwards-directed force onto the rotor when in operation. The lower region of the end face of the rotor magnet 112 acts as a counter bearing, this lower region being magnetized axially and, together with the pull ring 103' connected to the baseplate 111, generating an axial force downwards in the direction of arrow 138 on the rotor.

Figure 18:
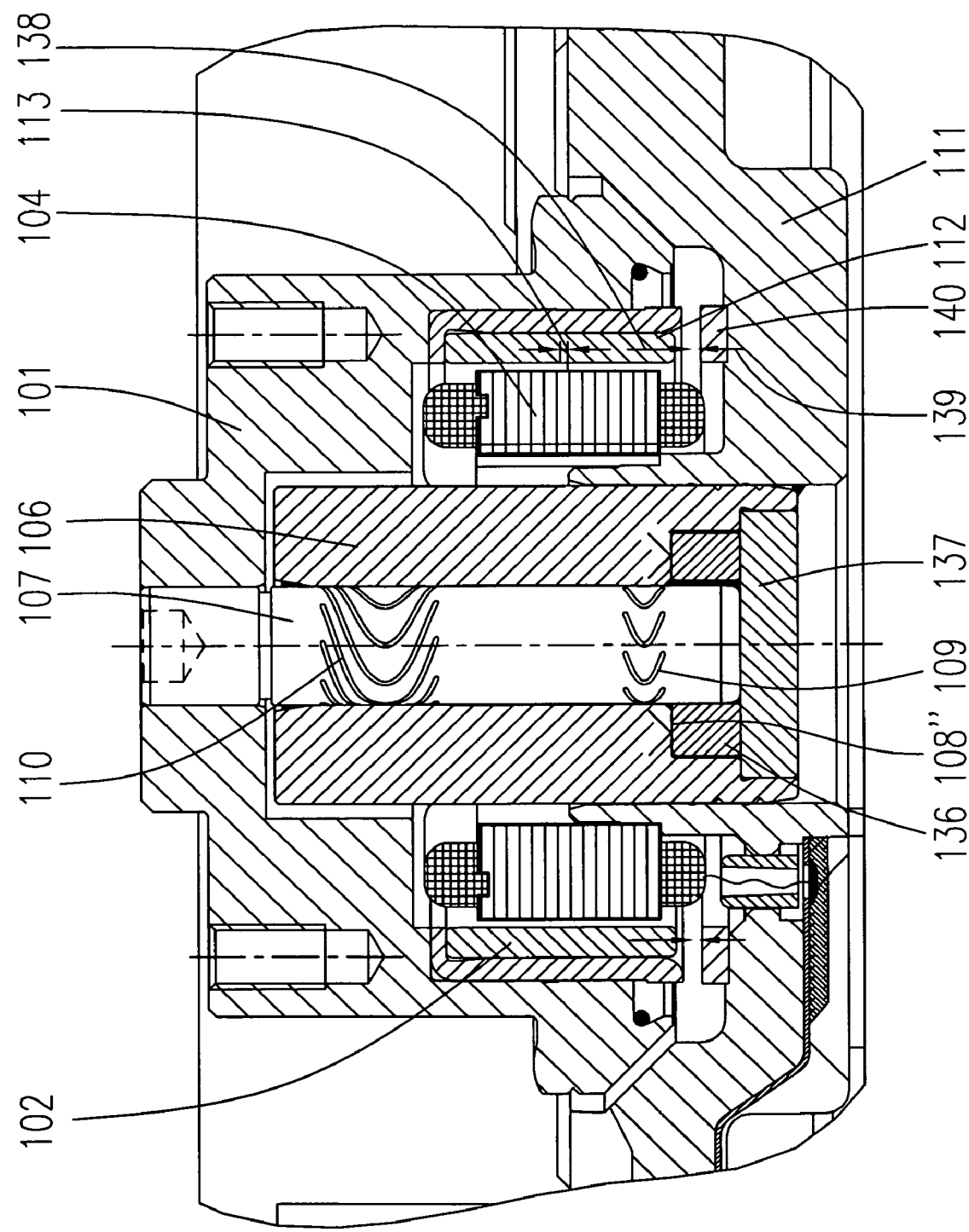
FIG. 18: section through a fluid-supported spindle motor having a fluid axial bearing between the shaft and counter plate

In FIG. 18, a modified embodiment of the spindle motor according to FIG. 17 is shown, having an upper and a lower radial bearing 109,110 as well as a fluid axial bearing 108" that is disposed between the topside of the thrust plate 136 connected to the shaft 107 and the opposite surface of the bearing bush 106. Through the rotation of the shaft 107, fluid pressure is built up in the bearing gap of the axial bearing 108" that presses the rotor 101 axially downwards in the direction of arrow 138. A pull ring 140 is provided as a counter bearing to this axial bearing that is formed from a permanent magnetic ring that is connected to the baseplate 111 and lies axially opposite the lower, axially magnetized end face 112 of the rotor magnet 102 and, owing to the repulsive effect of the two magnets, exerts an axial counterforce directed upwards in the direction of arrow 139 on the rotor 101.

In another variant of the embodiment according to the invention, the fluid axial bearing 108" may be omitted and replaced by a magnetic offset 113, i.e. an axial offset between the rotor magnet 102 and the stator stack 104, in which the rotor magnet 102 is offset off its magnetic center and disposed axially upwards with respect to the stator 104. This causes a force directed axially downwards in the direction of arrow 138 to be exerted on the rotor 101, this force being directed in the opposite direction to the repulsive force between the rotor magnet 102 and the permanent magnetic ring 103 acting on the rotor 101 axially upwards in the direction of arrow 139.

Figure 19:
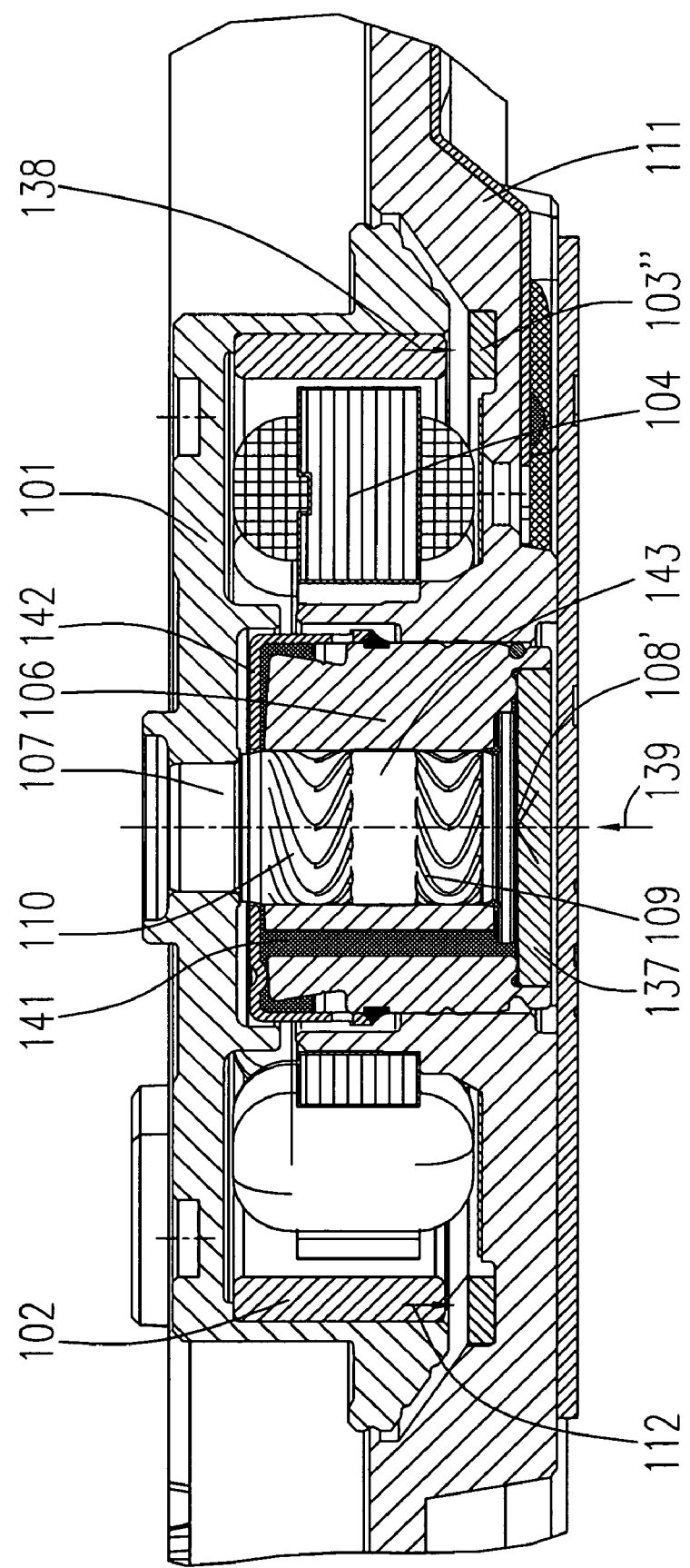
FIG. 19: section through a fluid-supported spindle motor having a ferromagnetic pull ring

In FIG. 19, a fluid-supported electric motor is shown that has a ferromagnetic pull ring 103" disposed axially below the rotor magnet. The pull ring 103" is connected to the baseplate 111 and, due to the rotor magnet 112 being axially magnetized at its lower end face, exerts a force directed axially downwards onto the rotor 101 in the direction of arrow 138. A fluid dynamic axial bearing acts as a counter bearing, the fluid dynamic axial bearing being disposed between the underside of the shaft 107 and the counter plate 137 sealing the bearing from below, and, on rotation of the shaft 107, exercising a force on the rotor 101 directed axially upwards in the direction of arrow 139.

Moreover, this fluid bearing has a recirculation channel 141 that connects the topside of the bearing bush 106, which in turn is sealed by a cap 142, to the underside of the bearing bush 106 and exits at the lower end of the shaft 107. The lower end of the shaft 107 widens in a radial direction and lies in a corresponding recess in the bearing bush 106. The recess is sealed underneath the lower end of the shaft 107 by a counter plate 137 that preferably carries the axial bearing patterns. As an alternative, the axial bearing patterns may be disposed on the underside of the widened region of the lower shaft. Moreover, two separate radial bearings 109, 110 are provided that are separated by a radially widened bearing gap, called the separator region 143, the radial bearings 109, 110 exerting pressure on the oil found in the bearing gap between the sleeve surface of the shaft 107 and the opposite inside surface of the bearing bush 106, thus giving the bearing its load-carrying capacity in a radial direction. The upper radial bearing 110 is formed asymmetrically in as far as the upper branch of the bearing patterns of the radial bearing 110 is longer than the lower branch, in order to thus ensure positive pressure, lying above environmental pressure, in the interior of the bearing, particularly in the separator region 143 between the two radial bearings 109, 110.

Figure 20:
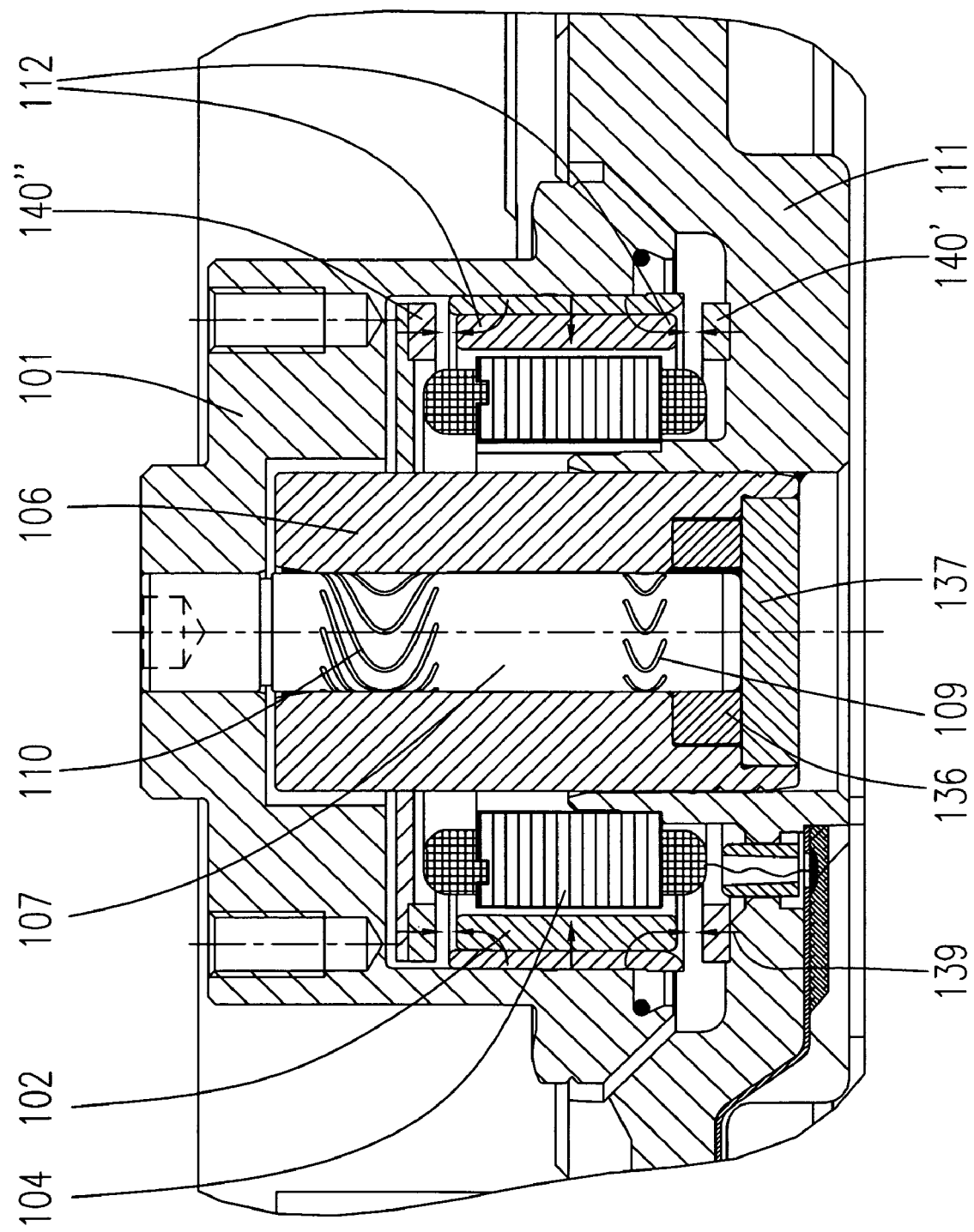
FIG. 20: section through a fluid-supported spindle motor having an asymmetric radial bearing

In FIG. 20, a fluid-supported electric motor is shown that has no fluid axial bearing. Illustrated are two axially spaced radial bearings 109, 110, the upper bearing being formed asymmetrically so as to exert an axially downwards directed pumping effect on the bearing fluid, thus ensuring positive pressure in the interior of the bearing.

The rotor magnet 102 has an upper as well as a lower end face region 112, each region being magnetized axially, whereas the central region of the rotor magnet 102, which lies opposite the stator 104, is alternatively magnetized in a radial direction in order to generate an electromotive drive. Above or below the two end faces of the rotor magnet 102, permanent magnetic rings 103, 103' are provided, each being magnetized axially in the opposite direction and fixedly connected to stationary parts of the motor, such as the bearing bush 106 and the baseplate 111, and each exerting repulsive forces on the rotor 101, thus realizing a purely magnetic axial bearing.

KEY TO DRAWINGS

1 Hub
2 Rotor magnet
3 Pull ring
4 Stator lamination stack
5 Stator winding
6 Bearing bush
7 Shaft
8 Axial bearing
9 Radial bearing
10 Radial bearing
11 Baseplate
12 Pull magnet
13 Offset
14 Air gap
15 Flux line
16 Topside (e.g. S)
17 Underside (e.g. N)
18 Direction of magnetization
19 Segment
20 Surface
21 Direction of arrow (with respect to the rotor)
22 Surface (part 4)
23 Surface (part 12, 12)
24 Recess (hub 1)
25 Damping material
36 Counter plate
101 Hub (rotor)
102 Rotor magnet
103 Pull ring 103', 103"
104 Stator stack
105 Stator winding
106 Bearing bush
107 Shaft
108 Axial bearing 108', 108"
109 Radial bearing
110 Radial bearing
111 Baseplate
112 Magnetic region
113 Offset (stator magnet)
114 Air gap
115 Flow of flux lines
116 Flux line
117 Active surface
118 Contact surface.
119 Magnetic pole
120 Underside (e.g. N)
121 Outside surface (e.g. S)
122 Magnetizing device
123 Coil shaft
124 Socket
125 Contact socket
126 Magnetizing wires
127 Main connector socket
128 Special magnetizing coil
129 Groove insulation
130 Magnetization wire
131 Flux guide piece 132 Flux line
133 Coil connector
134 End face
135 End face
136 Thrust plate
137 Counter plate
138 Direction of arrow
139 Direction of arrow
140 Pull ring, ferromagnetic 140', 140"
141 Recirculation channel
142 Cap
143 Separator region

The invention claimed is:

1. A permanent magnet motor having an axially magnetized pull magnet, comprising a baseplate on which a stator lamination stack having stator windings is disposed, wherein a hub is disposed opposite the baseplate, the hub being connected to a shaft that is supported with respect to a bearing bush via fluid bearings, wherein the fluid bearings comprise at least one radial bearing and at least one axial bearing, wherein the hub carries at least one annular rotor magnet that lies radially opposite the stator lamination stack, wherein a pulling device acting in an axial direction and operating under an influence of magnetic tensile forces is disposed in a region between the hub and a stationary part of the motor, wherein the pulling device consists of a permanent magnetic pull magnet on a side of the rotor that interacts magnetically with surfaces on a side of the stator.

2. A permanent magnet motor according to claim 1, wherein the pull magnet on the rotor side interacts with a ferromagnetic pull ring on the side of the stator aligned below.

3. A permanent magnet motor according to claim 2, wherein flux lines generated in the pull magnet emerge almost perpendicularly from a surface of the pull magnet and enter largely perpendicularly into a surface of the ferromagnetic pull ring.

4. A permanent magnet motor according to claim 2, wherein the fluid axial bearing is disposed between a thrust plate connected to the shaft and a counter plate, and generates an upwards directed force on the rotor during operation, a lower region of an end face of the rotor magnet being magnetized axially and, together with the ferromagnetic pull ring connected to the baseplate, generating an axial force downwards on the rotor and forming a counter bearing.

5. A permanent magnet motor according to claim 2, wherein the fluid axial bearing is disposed between a topside of a thrust plate connected to the shaft and an opposing surface of the bearing bush and, on rotation of the shaft, the fluid axial bearing builds up fluid pressure that generates an axial force on the rotor downwards.

6. A permanent magnet motor according to claim 2, wherein a recirculation channel disposed in the bearing bush connects a topside of the bearing bush to an underside of the bearing bush, wherein a lower end of the shaft has a radial widening that is disposed in a corresponding recess in the bearing bush, the recess being sealed by means of a counter plate, wherein two separate radial bearings are formed on a surface of the shaft, the radial bearings being spaced apart from each other by a radially widened separator region and building up pressure on oil found in the bearing gap between the shaft surface and an opposing inside surface of the bearing bush, thus giving the bearing its load-carrying capacity in a radial direction and wherein the upper radial bearing is formed asymmetric and builds up positive pressure lying above the environmental pressure in the interior of the bearing in the radially widened separator region between the two radial bearings.

7. A permanent magnet motor according to claim 1, wherein the pull magnet takes the form of a ring magnet magnetized in an axial direction.

8. A permanent magnet motor according to claim 1, wherein the pull magnet consists of ring segments magnetized in an axial direction.

9. A permanent magnet motor according to claim 1, wherein the pull magnet is made up of separate tablet-shaped, punctiform or tubular permanent magnet pieces distributed at regular intervals evenly about a circumference of the hub and magnetized in an axial direction.

10. A permanent magnet motor according to claim 1, wherein the pull magnet is disposed radially inwards on an inside surface of the hub in interaction with a topside of the stator lamination stack on a side of the stator.

11. A permanent magnet motor according to claim 1, wherein the pull magnet is disposed on an inside surface of a recess in the hub, and interacts with a radially outer portion of a topside of the stator lamination stack.

12. A permanent magnet motor according to claim 1, wherein the pull magnet is disposed radially inwards in a recess in the hub and acts on a radially inner portion of a topside of the stator lamination stack.

13. A permanent magnet motor according to claim 1, wherein the stator lamination stack is held resiliently at its lower surface in the baseplate by an elastic material that contacts the stator lamination stack at only the lower surface and stabilizes excitations on the part of the pull magnet (12) and steadies vibrations.

14. A permanent magnet motor according to claim 1, wherein the permanent magnetic pull magnet on the side of the rotor forms a part of the rotor magnet.

15. A permanent magnet motor according to claim 14, wherein at least one end face region of the rotor magnet is formed as a separate, circumferential, uniformly polarized magnetic region magnetized in an axial direction.

16. A permanent magnet motor according to claim 15, wherein the region of the end face of the rotor magnet is formed as an own differently magnetized magnetic region that is magnetized axially at its lower end.

17. A permanent magnet motor according to claim 15, wherein flux lines of the pull magnet flow outside a main flux region of the stator and of the rotor magnet.

18. A permanent magnet motor according to claim 15, wherein flux lines emerge approximately perpendicular from an underside of the magnetic region and form the approximately perpendicular flux lines flowing towards a topside of a ferromagnetic pull ring disposed in an arrangement lying opposite.

19. A permanent magnet motor according to claim 14, wherein at least one end face region of the rotor magnet is formed as a separate, circumferential, uniformly polarized magnetic region, wherein, starting from a horizontal upper surface of a pull ring, flow of flux lines of the magnetic region extends perpendicularly through a downwards directed surface of a back yoke of the rotor and extends in an arc to a radially outer vertical surface of the uniformly polarized magnetic region of the rotor magnet, and from there extends in an arc through material of the uniformly polarized magnetic region of the rotor magnet, the pull ring lying opposite and below the uniformly polarized magnetic region of the rotor magnet and at least a partial region of the back yoke as well.

20. A permanent magnet motor according to claim 14, wherein at least one end face region of the rotor magnet is formed as a separate, circumferential, uniformly polarized magnetic region, wherein a contact surface of the magnetic polarization of the magnetic region is chosen such that it lies outside a region of an active surface between the stator and a region of the rotor magnet alternatively polarized in a radial direction, wherein the contact surface is axially lower at its radially innermost region than at its radially outermost region.

21. A permanent magnet motor according to claim 1, wherein a permanent magnetic ring is connected to the baseplate and is disposed in an arrangement lying opposite an axially magnetized end face of the rotor magnet and, due to a repulsive effect of the axially magnetized end face of the rotor magnet and the permanent magnetic ring, forms an axial, upwards directed counterforce on the rotor.

22. A permanent magnet motor according to claim 1, wherein an axial offset is formed between the rotor magnet and the stator lamination stack in which the rotor magnet is offset off its magnetic center and disposed axially upwards with respect to the stator lamination stack, as a result of which an axially downwards directed force acts on the rotor, the axially downwards directed force being directed in an opposite direction to a repulsive force between the rotor magnet and a permanent magnetic ring acting on the rotor axially upwards, wherein a topside of the permanent magnetic ring is positioned lower than and interacts with a bottom side of the rotor magnet.

23. A permanent magnet motor according to claim 1, wherein a ferromagnetic pull ring connected to the baseplate, owing to a magnetic region disposed at a lower end face of the rotor magnet, generates an axially downwards directed force on the rotor, wherein a counter bearing formed between an underside of the shaft and a counter plate sealing the bearing generates, on rotation of the shaft, an axially upwards directed force on the rotor.

24. A permanent magnet motor according to claim 1, wherein the rotor magnet is unitary and has an upper and a lower magnetized region and a central region lying opposite the stator lamination stack is alternatively magnetized, wherein axial permanent magnetized rings are disposed adjoining the upper and lower magnetized regions of the rotor magnet, the permanent magnetized rings each generating repulsive forces on the rotor and forming a magnetic axial bearing.

25. A permanent magnet motor having an axially magnetized pull magnet, comprising a baseplate on which a stator lamination stack having stator windings is disposed, wherein a hub is disposed opposite the baseplate, the hub being connected to a shaft that is supported with respect to a bearing bush via one or more fluid bearings, wherein the hub carries at least one annular rotor magnet that lies radially opposite the stator lamination stack, wherein a pulling device acting in an axial direction and operating under an influence of magnetic tensile forces is disposed in a region between the hub and a stationary part of the motor, wherein the pulling device consists of a permanent magnetic pull magnet on a side of the rotor that interacts magnetically with surfaces on a side of the stator, wherein the rotor magnet is alternatively magnetized radially inwards, wherein the permanent magnetic pull magnet comprises a circumferentially magnetized magnetic region at a lower end of the rotor magnet, the circumferentially magnetized magnetic region having a first magnetic pole along a surface facing radially outwards and a second magnetic pole magnetically opposite to the first magnetic pole along a bottom surface which faces the stator.

26. A permanent magnet motor having an axially magnetized pull magnet, comprising a baseplate on which a stator lamination stack having stator windings is disposed, wherein a hub is disposed opposite the baseplate, the hub being connected to a shaft that is supported with respect to a bearing bush via one or more fluid bearings, wherein the hub carries at least one annular rotor magnet that lies radially opposite the stator lamination stack, wherein a pulling device acting in an axial direction and operating under an influence of magnetic tensile forces is disposed in a region between the hub and a stationary part of the motor, wherein the pulling device consists of a permanent magnetic pull magnet on a side of the rotor that interacts magnetically with surfaces on a side of the stator, wherein the rotor magnet is alternatively magnetized radially inwards, wherein the permanent magnetic pull magnet comprises a circumferentially magnetized magnetic region at a lower end of the rotor magnet, the circumferentially magnetized magnetic region having a first magnetic pole along a surface facing radially outwards and a second magnetic pole magnetically opposite to the first magnetic pole along a bottom surface which faces the stator, wherein the permanent magnetic pull magnet interacts with a ferromagnetic pull ring on the side of the stator aligned below the bottom surface.

* * * * *